United States Patent
Brass et al.

(10) Patent No.: US 7,286,930 B2
(45) Date of Patent: Oct. 23, 2007

(54) GHOST FOLLOWING (75) Inventors: Richard Brass, Seattle, WA (US); Bob McKenzie, Seattle, WA (US); Geoff Robertson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 638 days.

(21) Appl. No.: 10/769,555

(22) Filed: Jan. 30, 2004

(65) Prior Publication Data
US 2005/0171690 A1 Aug. 4, 2005

(51) Int. Cl.
*G01C 21/26* (2006.01)

(52) U.S. Cl. .................. 701/207; 701/23; 701/28; 701/211; 340/988; 340/995.1

(58) Field of Classification Search ........ 701/200–202, 701/23, 25, 207–208, 211, 213–214, 301; 340/988, 995.1, 901–905, 995.13, 995.14; 342/357.06, 357.12
See application file for complete search history.

(56) References Cited

U.S. PATENT DOCUMENTS 6,755,654 B2 * 6/2004 Hightower .................. 434/69

* cited by examiner

*Primary Examiner*—Yonel Beaulieu (57) ABSTRACT

A concept for providing navigation information is described. The concept includes a process for providing navigation information including deriving a destination for a first vehicle and determining a present location of the first vehicle. The process also includes computing maneuvering information from the destination and present location and adapting an image of a ghost vehicle in conformance with the maneuvering information.

20 Claims, 4 Drawing Sheets

GHOST FOLLOWING

TECHNICAL FIELD

This disclosure relates to vehicular guidance systems and more particularly to vehicular control and navigation systems.

BACKGROUND

As transportation devices and technologies have evolved, urban areas have increased in size and population and knowledge regarding areas over which transportation might be desirable, cognitive tasks associated with transportation have also increased in complexity. Further, the nature, complexity and degree of the risks to a traveler or bystander have increased as other aspects of transportation have become more sophisticated.

At one time, natural hazards, such as predators, weather-related phenomena and topographical features (e.g., cliffs, waterfalls etc.) were the issues associated with travel, and these were relatively comprehensible, predictable (to a degree) and could be planned for, watched for and appropriately addressed to some extent. However, with the advent of machine-powered travel, the nature of the risks, their unpredictability, the magnitude of potential disaster and the rapidity with which events are capable of unfolding have all increased. Increasing population densities in many areas further compound the difficulties of vehicular travel, through multiple factors, including congestion, lack of visibility and increased travel velocities.

SUMMARY

In one aspect, the present disclosure describes a process for providing navigation information including deriving a destination for a first vehicle and determining data relevant to a present location of the first vehicle. The process also includes computing maneuvering information using the derived destination information and present location data and adapting an image of a ghost vehicle in conformance with the maneuvering information.

In another aspect, the present disclosure describes a navigation system including, in combination, a display and a processor coupled to the display. The system also includes a vehicle position determination module coupled to the processor and configured to track position of a first vehicle and to update vehicle position information as the first vehicle moves. The system also includes a destination module coupled to the processor and configured to determine a desired destination for the first vehicle. The processor is configured to accept information from the position determination module and the destination module and to derive maneuvering instructions therefrom. The display is configured to adapt the maneuvering instructions to provide an image of a ghost vehicle and to adapt the image of the ghost vehicle to instruct a driver of the first vehicle.

In yet another aspect, the present disclosure describes an apparatus including geolocation processor means for coordinating destination data with current positional data, display means for displaying a ghost vehicle to a driver of a first vehicle and computation means coupled to the geolocation processor means and the display means. The computation means is for providing signals derived at least in part from the geolocation means to the display means to effectuate modification of the display of the ghost vehicle in conformance with the current positional data as the current positional data change responsive to movement of the first vehicle.

BRIEF DESCRIPTION OF THE CONTENTS

DETAILED DESCRIPTION

The following disclosure describes navigation aids useful in the context of vehicle operation and in rapidly and accurately providing intuitive navigation aids in a non-distracting manner to an operator of a vehicle. These techniques rely on positional data determination relative to the vehicle and integration of the positional data to provide a display of a ghost vehicle to a driver. As used herein, the term "ghost vehicle" means a display of a fictitious vehicle to a driver effectuated in such a manner that the display of the ghost vehicle allows the driver to "follow" the ghost vehicle much as one might follow a leading vehicle.

For example, an image of a ghost vehicle is presented to the driver (using heads up display or other means) and the driver follows the ghost vehicle as the ghost vehicle 'moves' along road in front of the driver's vehicle. When traveling along the interstate, for example, the ghost vehicle may appear to move further ahead of the driver. The gap may narrow, for example, as the ghost vehicle readies for an exit from the interstate. It is a rendering conveying an impression of a three-dimensional image on a surface approximating a two dimensional surface, which, along with the ghost's behavior within its environment, that make this approach helpful by conveying information in a non-distracting manner that is capable of operating in a "hands-free" modality.

For example, the ghost vehicle may appear to slow down (grow larger in the display) and actually shift from a rear view to a side view while executing a turn to provide visual instructions to the driver. The ghost vehicle should look like an actual car. The viewing angle should be appropriate to that of which the driver would see if they were following an actual car. It is located within visual cues that map to the surroundings, such as approaching a right turn when the physical environment, present position and trajectory towards the destination are consistent with executing a right turn.

In other words, the heads-up ghost vehicle display is provided in such a manner that the ghost vehicle will appear to maneuver roadways in front of the driver's vehicle. To do that, the ghost vehicle's position may be adjustable, that is, be placed on different areas of the heads-up display for different drivers in response to driver initialization to compensate, for example, for the driver's own height or other factors. The ghost vehicle is an approximately two-dimensional rendering of a three-dimensional environment and so the viewing angle shouldn't matter. Desirably, the ghost vehicle suggests a specific relationship between the guided vehicle, the programmed destination or route and the immediately surrounding environment.

In order to communicate visually to the driver that the ghost vehicle image within their car is not an actual vehicle outside the car, the ghost vehicle may be user-adjustable to render it in a monochrome or limited number of colors to differentiate it from reality or physical vehicles outside of the car.

This approach, as opposed to watching a map, looking at turn arrows or listening to audible instructions, reduces the cognitive load on the driver as it is a simple and direct method of communicating the desired path. The ability to efficiently provide such information in a non-distracting manner enables even a relatively unsophisticated user to efficiently employ the system and also assists in providing navigation information when language barriers or other communications obstacles may be present.

Introduction

Prior to describing several embodiments illustrating how an improved navigation technology may be implemented, the following section addresses an exemplary environment in which such technology finds utility. The discussion of the environment provides a framework within which various elements of the improved vehicular navigation technology can be developed.

Environment

Figure 1:
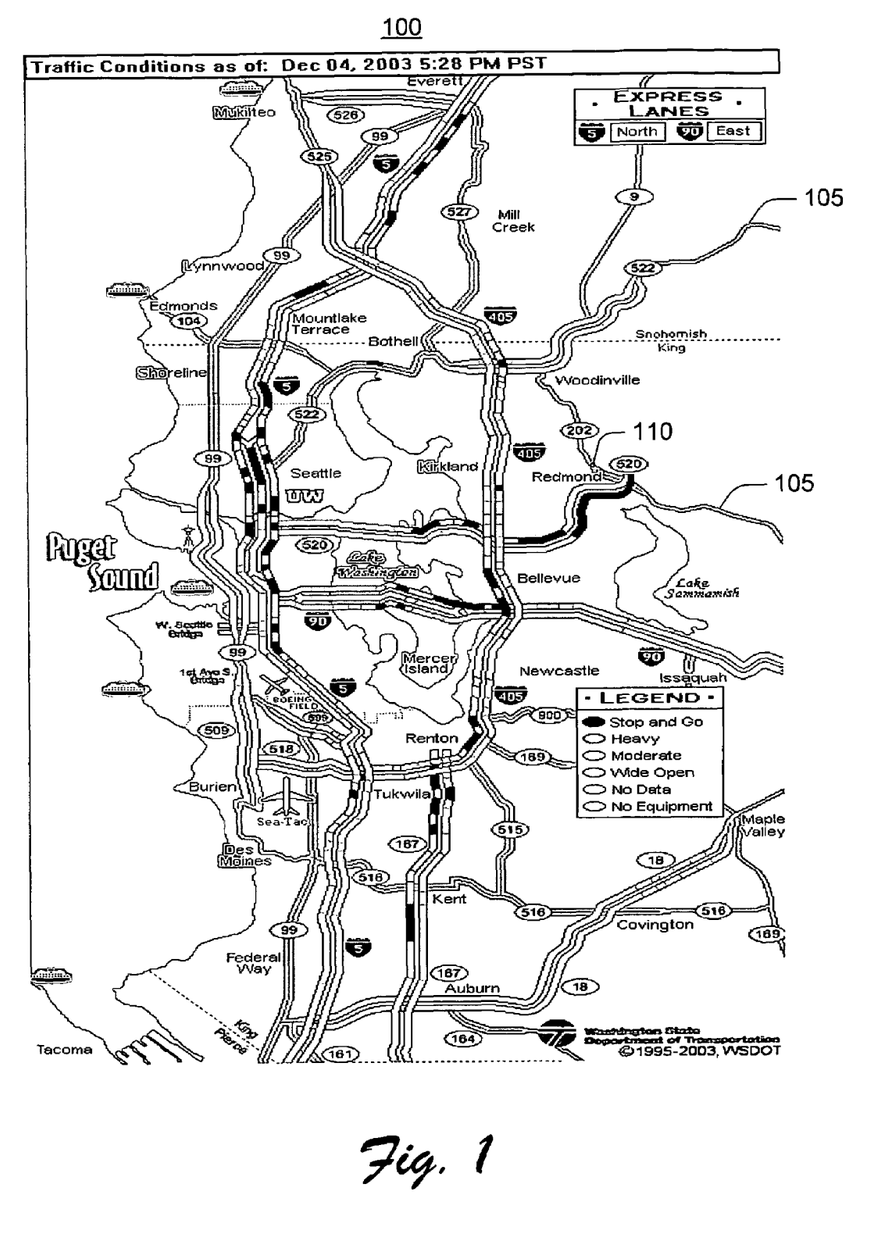
FIG. 1 illustrates an exemplary environment suitable for the concepts of the present disclosure.

FIG. 1 illustrates an exemplary environment 100 suitable for implementation of the presently-disclosed concepts. The environment 100 is represented by a portion of a screen shot (not to scale and not intended for navigational use) adapted from traffic information provided by wsdot.wa.gov/PugetSoundTraffic. In the environment 100, numerous roads, exemplified by roads 105, are present. An exemplary one of plurality of vehicles 110, represented as a dot, is shown.

The exemplary environment 100 is known to present problems relating to congestion, weather/visibility, navigational complications such as one-way streets, freeways/roadways that are difficult to navigate and numerous other issues such that a driver of the vehicle 110 who is a novice to the exemplary environment 100 may have difficulty in locating a parking space, a particular address, determination of an appropriate route and numerous other details. Further, the exemplary environment 100 is one where such a driver, perhaps a visitor from another country/time zone and thus suffering from jet lag and/or encountering a language barrier, might experience serious cognitive difficulties in attempting to read a map during rush hour traffic whilst driving down one of the major roads in a rainstorm or blizzard at night, particularly if traffic conditions are anomalous such as following a multi-vehicle pileup, major fire etc.

Destination data for the vehicle 110 may be pre-programmed by others or may be entered by a user interface, as will be described in more detail below. FIGS. 2-5 and accompanying text describe the disclosed concepts in more detail with reference to the environment addressed above in the context of FIG. 1.

System

Figure 2:
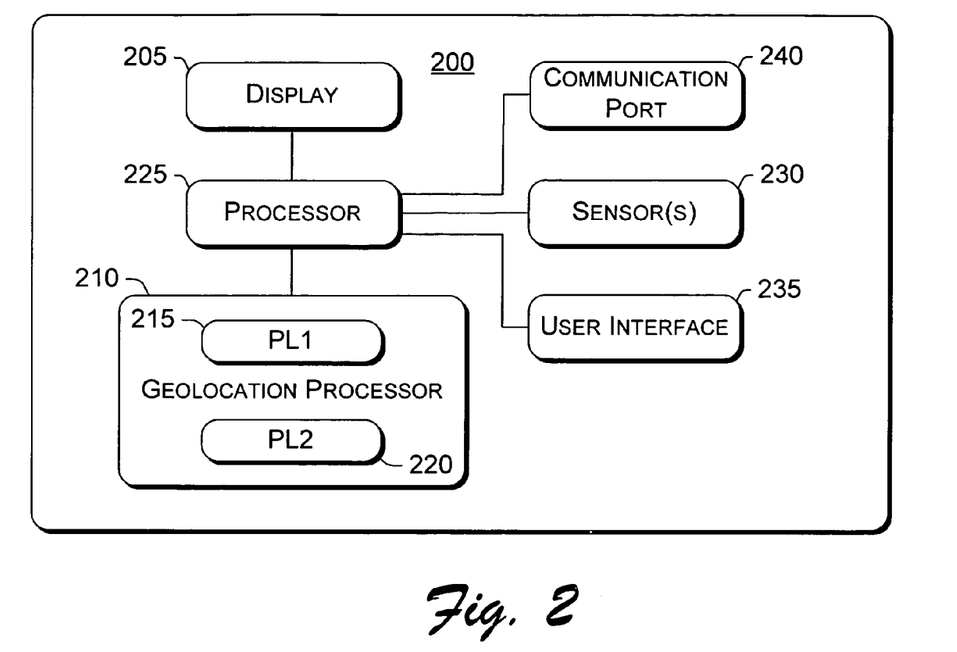
FIG. 2 is a block diagram of a system for providing a ghost vehicle display configured to provide navigational information to a driver of the vehicle of FIG. 1.

FIG. 2 is a block diagram of a system 200 for providing a ghost vehicle display 205 configured to provide navigational information to a driver of the vehicle 110 of FIG. 1. The display 205 may include a heads-up display and/or a conventional in-dash type display and may employ any of a number of conventional imaging technologies.

The system 200 includes a geolocation processor 210 comprising a first position location apparatus PL1 215 and a second position location apparatus PL2 220, although more or fewer such apparatus 215, 220 may be employed. In one embodiment, one or more of the apparatus 215, 220 may include a global positioning system receiver and may be included within the vehicle 110 or may be near the vehicle 110 at a fixed location and coupled thereto via, for example, a radio or optical communications link.

The system 200 also includes a processor or computation apparatus 225 which may comprise a conventional microprocessor or other similar arithmetic logic unit or central processing unit coupled to the display 205 and the geolocation processor 210. The system 200 further includes sensors 230 which may include capability for sensing one or more of factors such as environmental influences, e.g., presence or absence of precipitation, ambient lighting conditions such as overcast, daylight, twilight, evening, road surface traction factors such as consistent with presence or absence of moisture, ice, snow, oil and the like, radar or other remote sensing apparatus for determination of an approaching object/vehicle and/or an inappropriate approach etc. as is described below in more detail.

The system 200 optionally includes a user interface 235, such as a tactile input device (e.g., touchscreen coupled with the display 205, keyboard or keypad associated with suitable processing equipment, voice recognition based input device or the like). The system 200 also optionally includes a communications port 240 which may comprise an optical and/or RF link and which may be coupled to information sources via media such as the Internet, an intranet, cellular or other telephony, subscription services or publicly available information, highway hazard or condition warning system and the like.

In some situations, information from the sensor(s) 230, with or without seasonal diurnal variation information (e.g, seasonal day length variation) and/or time of day, may be coupled with positional data and destination to modify routing instructions delivered by the display 205. For example, such could reduce probability of potentially blinding the driver when a route otherwise preferable also appears to represent noticeable risk of posturing the driver in a risky situation. An exemplary such situation could be one such that a bright light source, e.g., the rising or setting sun, would logically represent a probability of being directly in line with other visual cues, such as a stop sign at which another party such as a motorcyclist, might be temporarily stopped at an approach to an intersection. Such might be effectuated by having the processor 225 reference data relating to a catalogue of relatively dangerous areas coupled with time of day and season together with destination data and routing computations, for example, or by tracking vehicular orientation data, ambient illumination, time of day, season and/or other factors.

Additionally, a number of drivers may have difficulty reading directive information such as street signs, due to weather conditions, poor night vision, extreme nearsightedness, retinal or other ocular injury or malfunction (e.g., cataracts, retinal detachment, floaters etc.), visual interference such as debris in the sight path or on the windshield or due to language barriers. A visual image of a ghost vehicle via, e.g., the display 205, can provide a way of at least partially transcending or ameliorating these limitations using easily-recognizable symbology that is language-independent and that also may usefully include capability for individual user-controlled modification of parameters affecting visual appearance, such as intensity, magnification, focus, position vis-à-vis the driver, driver's seat etc., color and/or modulation (e.g., pulsating, dashed or other distinctive outline/representation) and the like.

The position determination module 210, 215, 220 obtains geolocation data and may incorporate a conventional global position system capability. The position determination module 210, 215, 220 may be coupled to sensors 230 capable of determination of vehicle speed and/or other types of position/orientation/motion characteristics determination technologies.

For example, differential global positioning employs a conventional GPS receiver coupled with a location capability that is in turn coupled to an object having a known, predetermined position, to provide increased accuracy. Alternatively, multiple information sources may provide data for selective combination to derive positional data.

Conventional monostatic or bistatic radar or lidar capabilities also may provide primary or supplemental environmental or positioning information and can additionally provide information useful for collision avoidance by sensing inappropriate convergence with another vehicle or object, such as a bridge abutment, body of water or other impediment. Other types of environmental data relevant to driving strategy and determinable using conventional sensors 230 include road conditions (e.g., wet or icy), ambient illumination and the like. Such data are relevant when, e.g., a prudent driver would begin slowing earlier than one might otherwise in order to make a turn under inclement conditions and thus it might be desirable for the processor 225 to modify information directed to the display 205 to cause such to be reflected by behaviour of the ghost vehicle.

For example, the ghost vehicle may signal to the driver that braking is appropriate. This be effectuated by increasing or decreasing the apparent size of the ghost vehicle in the image. The concept follows the reality that object appear bigger when they are closer and smaller when they are farther away. Also, need for or apparent need for braking may be communicated by displaying or modulating "brake lights" on the ghost vehicle, and such may be done in contrasting colors or intensities.

Relevant aspect(s) of the sensor(s) 230 may include capability for proactive determination of conditions affecting vehicular performance characteristics, such as low fuel, excessive engine temperature and the like and may couple this type of operationally relevant information with information regarding the location of the vehicle 110 of FIG. 1 to provide the driver with notice of such and an option, which may be "hard-wired", for requesting an appropriate determination of a revised or intermediate destination such as a fuel vendor or service station. Such could also include an optional capability for facilitating the driver in requesting a location via the user interface 235 for instructions/communications to appropriate and locationally relevant emergency medical facilities, to facilitate communication with police or fire authorities and the like.

Primary or supplemental positioning data may be derived from location indication parameters provided by source(s) distributed along a roadway such as roads 105, much as conventional mile markers are (or by sensing such), including limited range radio signaling devices, objects within a roadway intended to be sensed by sensing fields which may be generated by appropriate field generators within the vehicle 110 and the like. Additionally, growing numbers of road systems (e.g., the I-PASS system deployed in at least portions of the Chicago area and operated under the auspices of the Illinois Tollway Authority, see illinoistollway.com/IPASS/) employ signaling devices analogous to RFID tags for automated toll collection and these kinds of systems can be capable of yielding positional information via appropriate signaling.

Data derived from one or more such sources or systems may be combined, and a degree of redundancy may be included within the system 200 to facilitate operation in the event of equipment or infrastructural system malfunction. Further, because such systems may not enjoy universal distribution or applicability, the position determination module 210, 215, 220 may incorporate adaptability, that is, be capable of deriving position information via a variety of such systems and, responsive to either automatic determination of malfunction or responsive to user selection (e.g., via the user interface 235), adapt to changing needs by selecting between one or more such systems for positional data.

Modern vehicles differ from older vehicles in that current anti-lock braking systems are designed to automatically pulse brake operation when the brake pedal is smoothly depressed and/or to control relative braking exhibited on various wheels in a manner consistent with maintaining control over vehicular direction under harsh driving conditions. Older vehicles that do not employ such technology may in some situations be more effectively controlled by pumping the brakes, but appropriate operation of the newer braking systems may be compromised by such pumping. Incorporating knowledge of braking system characteristics applicable to a target vehicle 110 in which such a system 200 is to be installed thus is important for proper system operation.

At the same time, in some situations, it may still be desirable to pump the brakes on the newer vehicular braking systems in order to signal to another vehicle that is rapidly converging, for example from the rear, that a collision is becoming increasingly probable. Such information may be derivable from sensing capabilities via sensor(s) 230 such as remote sensing, radar and the like.

These kinds of situations may occur when one vehicle 110 is stopped (for example, at a railroad crossing or intersection) and the driver of another vehicle is distracted (e.g., reading a map or novel, watching another person or video media or engaging in one or more activities generally not consistent with attentive driving) or is functionally impaired (e.g., voluntarily intoxicated, medical condition etc.) and thus simply has failed to respond appropriately to the impending situation. As a result, the driver of the one vehicle 110 may or may not be well advised to pump the brakes irrespective of the type of vehicle 110 being operated, and the system 200 may include capacity for providing such instruction via execution thereof by the ghost vehicle provided via the display 205.

Processes

Figure 3:
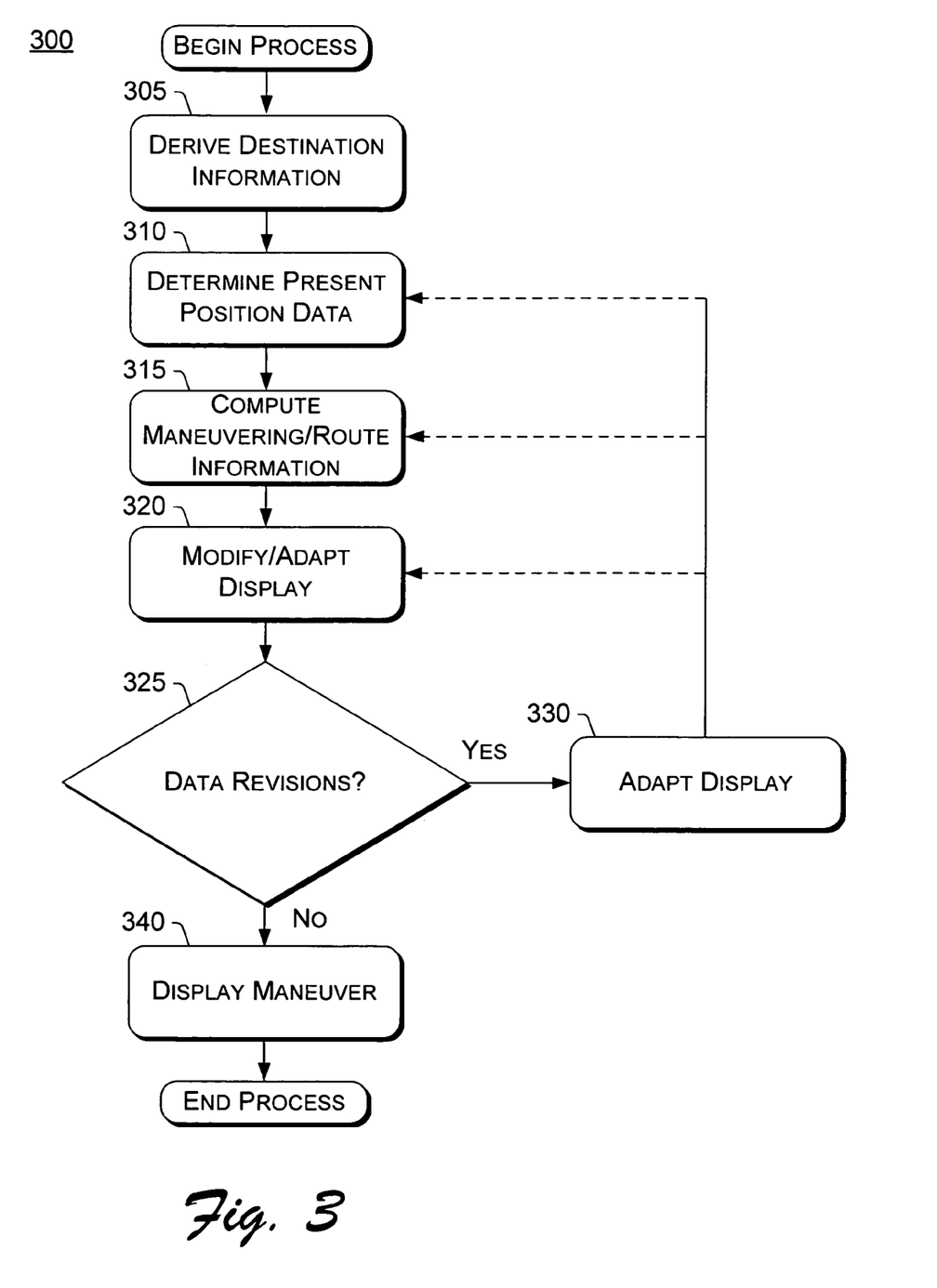
FIG. 3 is a flowchart depicting a process for providing a ghost vehicle display for the system of FIG. 2.

FIG. 3 is a flowchart depicting a process 300 for providing a ghost vehicle display for the system 200 of FIG. 2. The process 300 generally involves provision of navigation information, and includes deriving a destination for the vehicle 110 (block 305), determining a present location of the vehicle 110 (block 310), computing maneuvering information from the destination and present location (block 315) and modifying/adapting the display 205 providing an image of a ghost vehicle in conformance with the maneuvering information (block 320).

The process 300 begins in the block 305. In the block 305, the process 300 derives a destination for the vehicle. Derivation of the destination is carried out as described hereinabove, employing geolocation information (e.g., from geolocation processor 210), captured signals (e.g., from communications port 240), user input (e.g., via user interface 235) and/or stored positional data.

In the block 310, the process 300 determines a present location for the vehicle 110. Determining a present location is carried out using location determination apparatus (e.g., geolocation processor 210, GPS and/or other location determination techniques). For example, location determination may include determining present location of the vehicle 110 by selecting positional information from one or more of multiple positional data sources (e.g., 215, 220) and further may include adapting selecting positional information from the one or more of the multiple positional data sources to presently-apparent conditions and user selection criteria (e.g., via interface 235).

In the block 315, the process 300 computes route data, maneuvering information and the like.

In the block 320, the process 300 modifies/adapts the display 205 to reflect input information, appropriate routing data and the like. For example, adapting the display may include displaying the image of the ghost vehicle on a display 205 chosen from a group consisting of: a heads-up display and an in-dash display, or may include displaying the image of the ghost vehicle as executing a maneuver consistent with the first vehicle 110 converging on the destination. Such may include displaying the image of the ghost vehicle executing a maneuver chosen from a group consisting of: braking, signaling a turn, executing a turn, speeding, up, slowing down, executing emergency collision avoidance maneuvers, pumping brakes and crashing.

In a query task 325, the process 300 determines when or if data revisions are appropriate. Data revisions may come from user input (e.g., user preferences, route modification, destination change etc.) or may be responsive to captured signals reflective of changed environmental data. For example, such may reflect capturing signals representative of current traffic data and hazards and/or sensing environmental data representative of an environment of the vehicle 110.

When the query task 325 determines that one or more data revisions are appropriate, control passes to block 330. When the query task 325 determines that no data revisions are presently appropriate, control passes to block 340.

In the block 330, the process 300 determines appropriate adaptations for the display, and control passes back to one of blocks 310, 315, 320 (e.g., as represented by dashed lines/arrows) to effectuate such. For example, the block 330 may result in displaying an image including information from the signals and/or the environmental data in conformance with displaying the ghost vehicle.

In the block 340, the system 200 displays maneuvers relevant to the presenting situation. The process 300 then either continues or ends.

Figure 4:
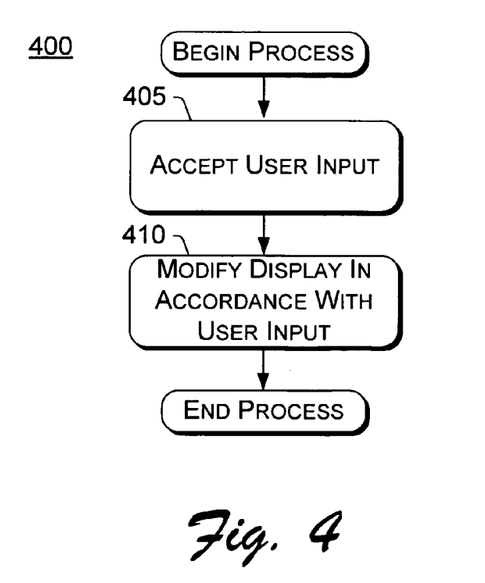
FIG. 4 is a flowchart depicting a process for modifying a ghost vehicle display for the system of FIG. 2.

FIG. 4 is a flowchart depicting a process 400 for modifying a ghost vehicle display for the system 200 of FIG. 2. The process 400 begins in a block 405, generally concerned with accepting user input information via the user interface 235 configured to facilitate individual user-controlled modification of parameters, which may include affecting visual appearance of the ghost vehicle.

In the block 405, input data are made available to the system 200 for modification of the display. In one embodiment, such data comprise user input regarding user preferences, such as the nature of the ghost vehicle display, personal adjustments such as height relative to the driver, illumination characteristics and variations thereof with environmental factors, such as ambient illumination, degree of traffic congestion, user evaluation of route difficulty and the like. Such user preferences may be stored for later recall by this or another operator of the system 200.

In a block 410, display parameters are adjusted in accordance with user-specified preferences, among other things.

The block 410 may include modifying the image of a ghost vehicle in conformance with the user input information provided in the block 405, for example. The process 400 then ends.

Computer System

Figure 5:
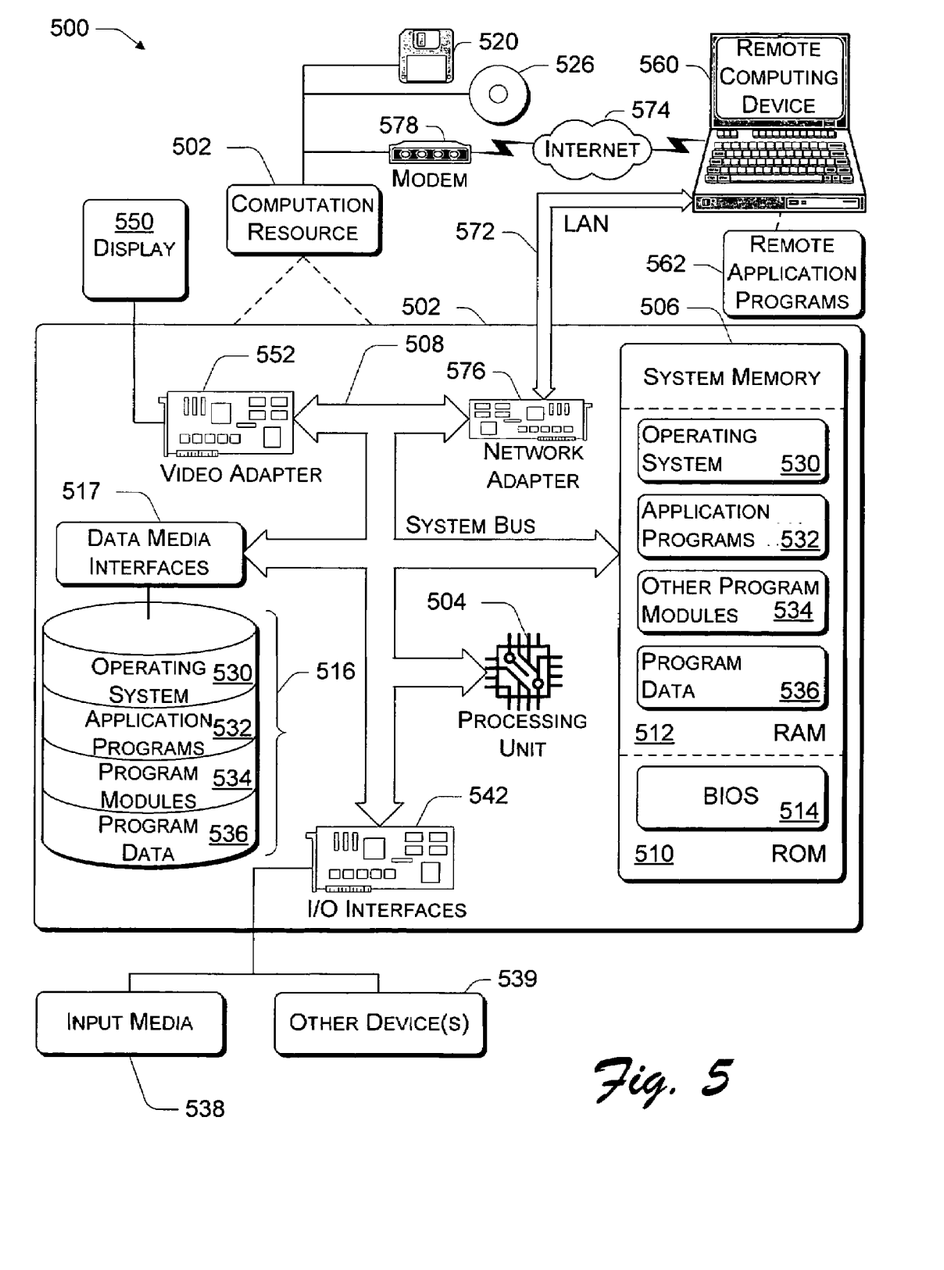
FIG. 5 is a block diagram of a computer system applicable to the context of the system of FIG. 2.

FIG. 5 is a block diagram of a computer system 500 applicable to the context of the system 200 of FIG. 2. The present disclosure is provided in part in the general context of computer-executable instructions, such as program modules, executed by one or more computers or other devices. Generally, program modules include routines, programs, objects, components, data structures etc. that perform particular tasks or implement particular abstract data types. Typically the functionality of the program modules may be combined or distributed as desired in various embodiments.

The concepts disclosed herein may be implemented in hardware or a combination of hardware, software, and/or firmware. For example, one or more application specific integrated circuits (ASICs) could be designed or programmed to embody the concepts disclosed herein.

FIG. 5 illustrates an example of a general computer environment 500. The illustrated operating environment is only one example of a suitable operating environment and is not intended to suggest any limitation as to the scope of use or functionality of the embodiments of this disclosure. Other well-known computing systems, environments, and/or configurations may be suitable for implementation of the disclosure.

FIG. 5 depicts a general example of a computation resource 502 that can be used to implement the processes described herein. The computation resource 502 is shown as an example of a computer in which various embodiments of these processes can be practiced. The computation resource 502 is illustrated as only an example of a computing device that may be used with the invention; other devices may alternatively used that include more components or alternatively fewer components than those illustrated in FIG. 5.

The computation resource 502 includes one or more processors or processing units 504, a system memory 506, and a bus 508 that couples various system components including the system memory 506 to processor(s) 504. The bus 508 represents one or more of any of several types of bus structures, including a memory bus or memory controller, a peripheral bus, an accelerated graphics port and a processor or local bus using any of a variety of bus architectures. The system memory 506 includes nonvolatile read only memory (ROM) 510 and random access memory (RAM) 512, which may or may not be a volatile memory. A basic input/output system (BIOS) 514, containing the basic routines that help to transfer information between elements within computation resource 502, such as during start-up, is stored in ROM 510.

The computation resource 502 further may include a hard disk drive 516 for reading from and writing to a hard disk, not shown, coupled to bus 508 via a data media interface 517 (e.g., a SCSI, ATA, or other type of interface); a magnetic disk drive (not shown) for reading from and writing to a removable magnetic disk 520 and an optical disk drive (not shown) for reading from and/or writing to a removable optical disk 526 such as a compact disc or CD, DVD, or other optical media. The hard disk drive 516, magnetic disk drive and/or optical disk drive are each coupled to the system bus 508 by one or more data media interfaces 517. Alternatively, the hard disk drive 516, magnetic disk drive and/or optical disk drive can be coupled to the system bus 508 by one or more interfaces (not shown).

The drives and their associated computer-readable media provide nonvolatile storage of computer readable instructions, data structures, program modules and other data for the computation resource 502.

Although the exemplary environment is described herein as employing a hard disk drive 516, a removable magnetic disk 520 and a removable optical disk 526, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk drive 516, magnetic disk 520, optical disk 526, ROM 510, or RAM 512, including an operating system 530, one or more application programs 532, other program modules 534 and program data 536. A user may enter commands and information into computation resource 502 through input devices such as input media 538 (e.g., keyboard/keypad, tactile input or pointing device, joystick, touchscreen or touchpad, microphone, antenna etc. comprising user interface 235 of FIG. 2). Such input devices 538 are coupled to the processing unit 504 through an input/output interface 542 that is coupled to the system bus (e.g., a serial port interface, a parallel port interface, a universal serial bus (USB) interface, an IEEE 1354 (Firewire) interface, etc.). A monitor 550 or other type of display device (e.g., display 205 of FIG. 2) is also coupled to the system bus 508 via an interface, such as a video adapter 552.

The computation resource 502 may include capability for operating in a networked environment using logical connections to one or more remote computers, such as a remote computer 560. The remote computer 560 may be a personal computer, a server, a router, a network PC, a peer device or other common network node, and typically includes many or all of the elements described above relative to the computation resource 502. In a networked environment, such as that illustrated with computing environment 500, program modules depicted relative to the computation resource 502, or portions thereof, may be stored in a remote memory storage device. By way of example, remote application programs 562 reside on a memory device of the remote computer 560. The logical connections represented in FIG. 5 may include a local area network (LAN) 572 and/or a wide area network (WAN) 574.

Such networking environments, are commonplace in modern computer networks, and in association with intranets and the Internet. In certain embodiments, the computation resource 502 executes an Internet Web browser program (which may optionally be integrated into the operating system 530) such as the "Internet Explorer" Web browser manufactured and distributed by Microsoft Corporation of Redmond, Wash.

When used in a LAN networking environment, the computation resource 502 is coupled to a network such as the local area network 572 through a network interface or adapter 576. When used in a WAN networking environment, the computation resource 502 typically includes interfaces such as a modem 578 or other means for establishing communications over the wide area network 574, such as the Internet. The modem 578, which may be internal or external, is coupled to the system bus 508 via a serial port interface. In a networked environment, program modules depicted relative to the computation resource 502, or portions thereof, may be stored in the remote memory storage device. It will be appreciated that the network connections shown are exemplary and other means of establishing a communications link between the computers may be used.

The computation resource 502 typically includes at least some form of computer readable media. Computer readable media can be any available media that can be accessed by the computation resource 502. By way of example, and not limitation, computer readable media may comprise computer storage media and communication media.

Computer storage media includes volatile and nonvolatile, removable and non-removable media implemented in any method or technology for storage of information such as computer readable .instructions, data structures, program modules or other data. Computer storage media includes, but is not limited to, RAM, ROM, EEPROM, flash memory or other memory technology, CD, digital versatile disks (DVD) or other optical storage, magnetic cassettes, magnetic tape, magnetic disk storage or other magnetic storage devices, or any other media which can be used to store the desired information and which can be accessed by the computation resource 502.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal.

By way of example, and not limitation, communication media includes wired media such as wired network or direct-wired connection, and wireless media such as acoustic, RF, infrared and other wireless media. Combinations of any of the above should also be included within the scope of computer readable media.

Conclusion

Although the description above uses language that is specific to structural features and/or methodological acts, it is to be understood that the recitation of the appended claims is not limited to the specific features or acts described. Rather, the specific features and acts are disclosed as exemplary forms of implementing these concepts.

What is claimed is:

1. A navigation system comprising:
    a display;
    a processor coupled to the display;
    a vehicle position determination module coupled to the processor and configured to track position of a first vehicle and to update vehicle position information as the first vehicle moves; and
    a destination module coupled to the processor and configured to determine a desired destination for the first vehicle, wherein the processor is configured to accept information from the position determination module and the destination module and to derive maneuvering instructions therefrom, wherein the display is configured to adapt the maneuvering instructions to provide an image of a ghost vehicle and to adapt the image of the ghost vehicle to instruct a driver of the first vehicle in accordance with the maneuvering instructions such that the ghost vehicle is displayed as executing a maneuver to be executed by the first vehicle at another location that has not yet been reached by the first vehicle.

2. The system of claim 1, wherein the display is chosen from a group consisting of: a heads-up display and an in-dash display.

3. The system of claim 1, wherein the destination module includes a communications system configured to provide current traffic data and the processor is configured to adapt maneuvering instructions responsive to the current traffic data.

4. The system of claim 1, wherein the vehicle position determination module includes a global positioning system capability.

5. The system of claim 1, further comprising a user interface configured to facilitate individual user-controlled modification of parameters affecting visual appearance of the ghost vehicle.

6. The system of claim 1, wherein the vehicle position determination module includes multiple positional data sources and the processor further comprises capability for adapting a selection of the multiple sources to present conditions.

7. The system of claim 1, further comprising:
a communications system configured to capture signals and wherein the display is further configured to provide an image including information from the signals; and
a sensing module configured to capture environmental data and/or data relevant to vehicular operational parameters and wherein the display is further configured to provide an image including information based on information from the sensing module data.

8. A process for providing navigation information comprising:
deriving a destination for a first vehicle;
determining a present location of the first vehicle;
computing maneuvering information from the destination and present location; and
adapting an image of a ghost vehicle in conformance with the maneuvering information such that the ghost vehicle is displayed as executing a maneuver to be executed by the first vehicle at another location that has not yet been reached by the first vehicle.

9. The process of claim 8, wherein adapting comprises displaying the image of the ghost vehicle on a display chosen from a group consisting of: a heads-up display and an in-dash display.

10. The process of claim 8, wherein adapting comprises displaying the image of the ghost vehicle as executing a maneuver consistent with the first vehicle converging on the destination.

11. The process of claim 8, wherein adapting comprises displaying the image of the ghost vehicle executing a maneuver chosen from a group consisting of: braking, signalling a turn, executing a turn, speeding up, slowing down, executing emergency collision avoidance maneuvers, pumping brakes and crashing.

12. The process of claim 8, further comprising:
capturing signals representative of current traffic data and hazards;
sensing environmental data representative of an environment of the first vehicle; and
displaying an image including information from the signals and the environmental data in conformance with displaying the ghost vehicle.

13. The process of claim 8, further comprising:
accepting user input information via a user interface configured to facilitate individual user-controlled modification of parameters affecting visual appearance of the ghost vehicle; and
modifying the image of a ghost vehicle in conformance with the user input information.

14. The process of claim 8, wherein determining comprises determining present location of the first vehicle by selecting positional information from one or more of multiple positional data sources and further comprising adapting selecting positional information from the one or more of the multiple positional data sources to present conditions and user selection criteria.

15. An apparatus comprising:
geolocation processor means for coordinating destination data with current positional data;
display means for displaying a ghost vehicle to a driver of a first vehicle; and
computation means coupled to the geolocation processor means and the display means, the computation means for providing signals derived at least in part from the geolocation means to the display means to effectuate modification of the display of the ghost vehicle in conformance with the current positional data as the current positional data change responsive to movement of the first vehicle such that the ghost vehicle is displayed via the display means as executing a maneuver to be executed by the first vehicle at another location that has not yet been reached by the first vehicle.

16. The apparatus of claim 15, further comprising signal capture means for capturing at least one signal indicative of traffic conditions and hazards and is coupled to the computation means and wherein the computation means is further for providing signals derived at least in part from the at least one signal to the display means to effectuate modification of the display of the ghost vehicle in conformance with information contained in the at least one signal.

17. The apparatus of claim 15, further comprising user interface means coupled to the computation means and configured to accept user input to facilitate individual user-controlled modification of parameters affecting visual appearance of the ghost vehicle by the computation means.

18. The apparatus of claim 15, wherein the geolocation processor means comprises multiple positional data sources and the computation means further comprises capability for adapting a selection of the multiple sources to present conditions.

19. The apparatus of claim 15, further comprising environmental sensing means coupled to the computation means and wherein the computation means is further for providing at least one signal derived at least in part from the environmental sensing means to the display means to effectuate modification of the display of the ghost vehicle in conformance with the at least one signal.

20. The apparatus of claim 15, wherein the geolocation processor means accepts positional information derived from a global positioning system.

* * * * *